UNITED STATES PATENT OFFICE.

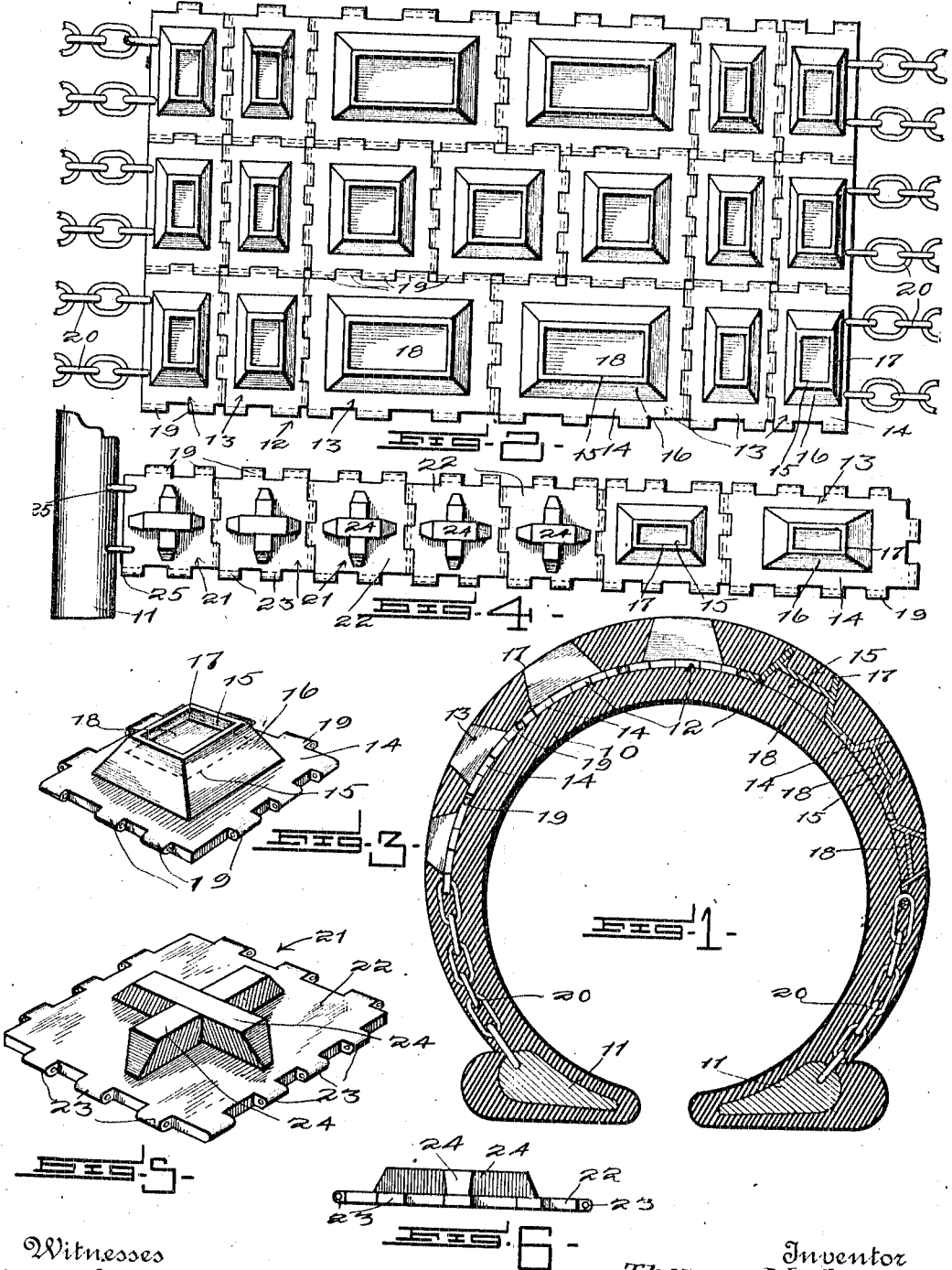

THOMAS W. COOPER, OF CALDWELL, NEW JERSEY.

TIRE-SHOE.

Specification of Letters Patent. Patented Aug. 4, 1914.

Application filed October 27, 1913. Serial No. 797,600.

*To all whom it may concern:*

Be it known that I, THOMAS W. COOPER, a subject of the King of Great Britain, residing at Caldwell, in the county of Essex and State of New Jersey, have invented certain new and useful Improvements in Tire-Shoes, of which the following is a specification.

My invention relates to improvements in automoblie tire shoes and has particular reference to apparatus of this character provided with a novel form of reinforcing means embedded therein.

An important object of this invention is to provide means of the above mentioned character, which will strengthen the tire shoe, render it puncture proof to a high degree, durable, and prevent the same from skidding.

Other objects and advantages of the invention will be apparent during the course of the following description.

In the accompanying drawings forming a part of this specification and in which like numerals are employed to designate like parts throughout the same, Figure 1 is a transverse sectional view through a tire shoe embodying my invention, Fig. 2 is a plan view of the reinforcing means therefor, Fig. 3 is a perspective view of a link included in the reinforcing means, Fig. 4 is a plan view of a slightly different form of reinforcing means, Fig. 5 is a perspective view of a link included in the second form of reinforcing means, and, Fig. 6 is an end elevation of the link shown in Fig. 5.

In the drawings, wherein for the sake of illustration is shown a preferred embodiment of my invention, the numeral 10 designates a tire shoe, preferably formed of rubber, and fabric, as is customary. The tire shoe 10 is provided adjacent its inner edges with beads 11, for suitable connection with the rim of a wheel. Embedded within the shoe 10 is metallic reinforcing means 12, which, as shown in Figs. 1 and 2, comprises a plurality of links 13. These links are identical in construction, but may vary in size. As more clearly shown in Figs. 1 and 3, each link comprises an inner plate 14, provided with a central opening 15, surrounded by a trapezoidal casing 16, rigidly mounted upon the plate 14 and decreasing in width outwardly, as shown. The reduced upper end 17 of the trapezoidal casing 16 is formed open, as shown. Arranged substantially equi-distantly between the open inner and outer ends of the trapezoidal casing 16 is a horizontally arranged partition plate 18, preferably formed integral with the casing 16. The function of this partition plate is to prevent nails, tacks or the like from passing through the tire shoe, whereby the same is rendered to a high degree puncture proof. The plate 14 is provided along its edges with apertured knuckles 19, to coöperate with corresponding knuckles formed upon the adjacent link and pivotally connected therewith by a suitable pin. It is thus seen that the reinforcing means including the plurality of pivotally connected links 13 is highly flexible, whereby the resiliency of the tire shoe is not impaired. The reinforcing means 12 is embedded within the material of the tire shoe, through the tread portion thereof, and the rubber passes into the trapezoidal casings 16, above and below the partitions 18, filling the same, to securely hold the reinforcing means in place, whereby the entire construction is in effect integral. The outer ends of the trapezoidal casings 16 extend flush with the outer surface of the tire shoe 10, serving an anti-skid means.

Connected with the end links 13 are chains 20, embedded within the material of the tire shoe, and connected with the beads 11, as shown. I prefer to employ these chains, as the tire is not ordinarily subjected to great wear or liability to puncture at the inner portion thereof, but it is obvious that the links 13 may be continued and directly connected with the beads 11, if desired.

In Figs. 4 to 6 inclusive, I have shown a slightly modified form of reinforcing means which is to be embedded within the tire shoe in a similar manner as described in connection with the first form of reinforcing means. This second form of reinforcing means comprises a suitable number of the links 13, preferably arranged at the tread portion of the tire shoe. Instead of employing the chains 20, I may employ a plurality of pivotally connected links 21. Each of these links, as more clearly shown in Figs. 5 and 6, comprises a plate 22, provided with apertured knuckles 23, by means of which the plates are pivotally connected by pins or the like. Formed upon the outer surface of each of the plates 22 are lugs or ribs 24, which cross, as shown, and are trapezoidal in cross-section, increasing in width outwardly. These plates are embedded within the material of the tire shoe, with the outer faces of the lugs 24 preferably flush with the outer surface of the tire shoe. The outermost links 21 may be attached to the beads 11 by any suitable means, such as links 25, as shown in Fig. 4.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having described my invention, I claim:—

1. A tire shoe having reinforcing means embedded therein, comprising a plurality of pivoted links, each link comprising a plate provided with an opening, an open ended casing formed upon the plate, surrounding the opening thereof and extending outwardly therefrom, and a partition arranged within the casing between the inner and outer ends thereof.

2. A tire shoe having reinforcing means embedded therein, comprising a plurality of pivoted links, each link comprising a plate provided with a central opening, an open ended trapezoidal casing formed upon the plate, surrounding the opening thereof, and decreasing in width outwardly with its reduced end flush with the outer surface of the tire shoe, a partition arranged within the trapezoidal casing at a point substantially equi-distantly spaced from the ends thereof, and means connecting the end links with the beads of the tire shoe.

In testimony whereof I affix my signature in presence of two witnesses.

THOMAS W. COOPER.

Witnesses:
J. H. CODDINGTON,
G. S. DAUDAGENEN.